(12) United States Patent
Eiban et al.

(10) Patent No.: US 6,708,470 B2
(45) Date of Patent: Mar. 23, 2004

(54) DEVICE FOR PLACING LABEL SLEEVES ONTO CONTAINERS

(75) Inventors: Günther Eiban, Regensburg (DE); Ernst Seidl, Hagelstadt (DE)

(73) Assignee: Krones AG, Neutraubling (DE)

( * ) Notice: Subject to any disclaimer, the term of this patent is extended or adjusted under 35 U.S.C. 154(b) by 33 days.

(21) Appl. No.: 09/879,599

(22) Filed: Jun. 12, 2001

(65) Prior Publication Data

US 2002/0002812 A1 Jan. 10, 2002

(30) Foreign Application Priority Data

Jun. 17, 2000 (DE) .................................. 200 10 837 U

(51) Int. Cl.[7] .............................................. B65B 11/00
(52) U.S. Cl. ........................................ 53/585; 156/494
(58) Field of Search .......................... 53/556, 585, 291; 156/494, 556, 567

(56) References Cited

U.S. PATENT DOCUMENTS

| | | | | |
|---|---|---|---|---|
| 2,852,899 A | * | 9/1958 | Murrell | 53/585 |
| 3,714,756 A | * | 2/1973 | MacInnes et al. | 53/585 |
| 3,802,152 A | * | 4/1974 | Strub | 53/585 |
| 4,013,496 A | | 3/1977 | Amberg | 53/291 |
| 4,162,601 A | * | 7/1979 | Allen | 53/556 |
| 4,177,546 A | * | 12/1979 | Geisinger | 53/585 |
| 4,237,675 A | | 12/1980 | Myers | 53/585 |
| 4,514,966 A | * | 5/1985 | Konstantin | 53/585 |
| 5,607,045 A | | 3/1997 | Kronseder | |
| 6,474,390 B1 | * | 11/2002 | Vandevoorde | 53/585 |

FOREIGN PATENT DOCUMENTS

| | | |
|---|---|---|
| DE | 1090570 | 10/1960 |
| DE | 2551621 | 5/1976 |
| DE | 2950785 | 6/1981 |
| DE | 19547697 | 6/1997 |
| DE | 19716079 | 4/1998 |
| DE | 29811779 | 11/1998 |

* cited by examiner

Primary Examiner—Stephen F. Gerrity
(74) Attorney, Agent, or Firm—Marshall, Gerstein & Borun LLP

(57) ABSTRACT

Device for placing label sleeves (2) onto containers (1) such as bottles or similar items by means of a first apertured pusher (4), positioned coaxially with respect to a container which carries a partially positioned label sleeve, and which can be moved forward and backward axially with respect to the longitudinal axis of the container, in a controlled manner, and whose internal diameter is at least slightly smaller than the diameter of the label sleeve (2) and, coaxially with respect to the first apertured pusher (4), a second pusher (5) is provided internally, which is led in a manner so it can be moved axially with respect to the first apertured pusher (4).

8 Claims, 5 Drawing Sheets

FIG. 2
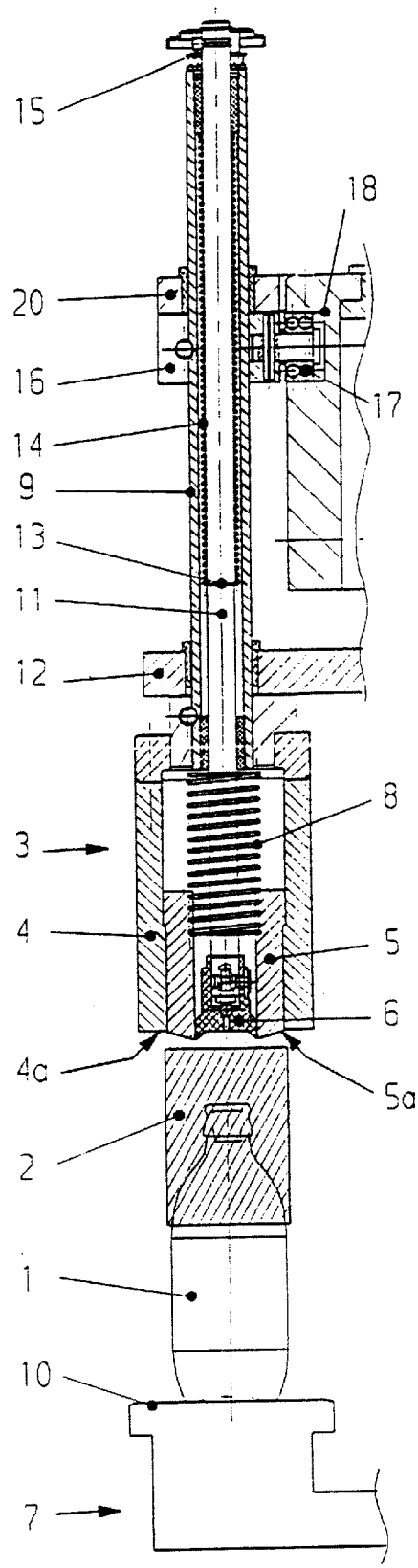
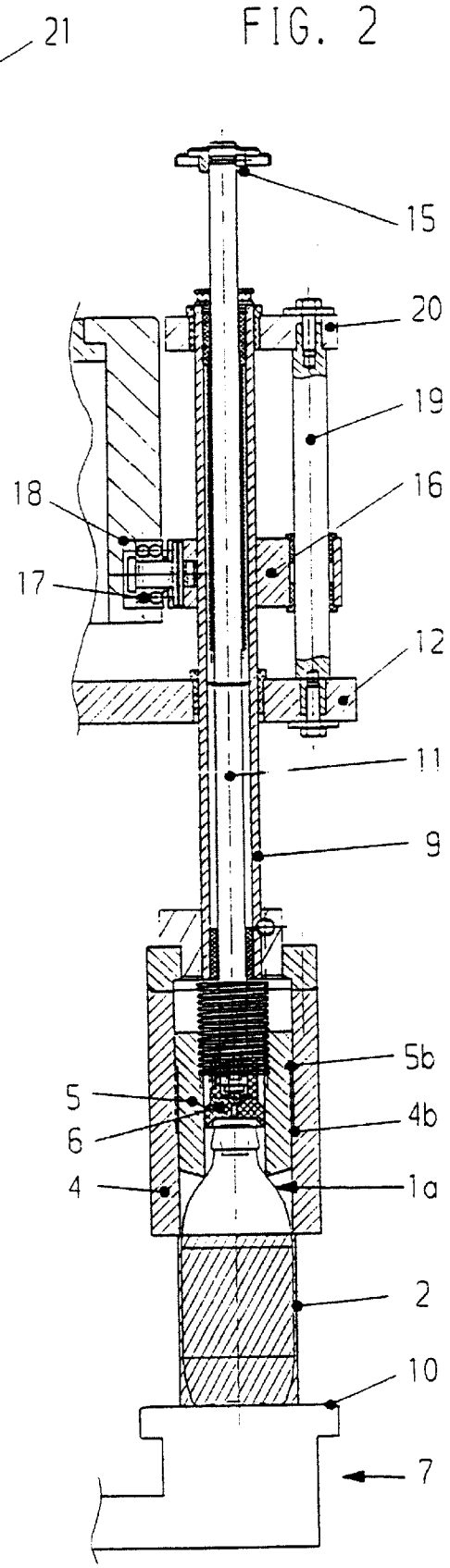

DEVICE FOR PLACING LABEL SLEEVES ONTO CONTAINERS

FIELD OF THE INVENTION

The invention relates to a device for placing label sleeves onto containers such as bottles or similar items.

BACKGROUND OF THE INVENTION

A device is known from U.S. Pat. No. 4,237,675 for the axial placement of label sleeves made of heat shrinkable plastic film material. With the help of an apertured disk which can be moved in a controlled manner longitudinally with respect to a high axis of a bottle, the label sleeve which initially, at the time it enters into the device, is only temporarily positioned from the top onto the bottle shoulder, is shifted axially into the desired final position. If, in this final position, the upper edge of the label sleeve presents only a small radial interval with respect to the shaped shoulder of the bottle exterior, which is pulled inward, it is possible to choose an internal diameter of the apertured disk which is only slightly smaller than the diameter of the label sleeve, so that the apertured disk does not come in contact with the bottle wall. The problem which arises in this context is that, especially in the starting phase of the motion of placement of the label sleeve, its upper edge is very unstable, due to the small material thickness. Thus there is a risk that the label edge will buckle radially inward in the case where a force with axial direction is applied, resulting later during the course of the procedure in its insertion into the opening of the apertured disk, which means that, from that time on, no additional axial movement of the label sleeve occurs.

SUMMARY OF THE INVENTION

The invention is based on the problem of providing a device for placing label sleeves onto containers such as bottles or similar items, which device presents an increased operational reliability.

The solution according to the invention provides the advantage that, precisely at the beginning of the placement motion, when, because of the high buckling length of the label sleeve, which in this phase is still largely free standing, the risk of inward buckling is highest, the upper label edge is prevented from sliding through into the free aperture cross section of the label pusher, in an effective manner. During the traction of the placement movement, the free buckling length is continuously decreased as a result of the increasing bracing of the bottle wall on the radial internal side, and, consequently, the risk of a radial inward buckling of the upper label edge continuously decreases.

According to a variant the invention, it is advantageous to hold a bottle, during the axial placement of a label sleeve, in an upright position with its bottom on a standing surface, preferably with axial clamping between its bottom and head area.

According to an additional variant of the invention, it is advantageous, at the beginning of the placement movement, to raise the label sleeve pusher again, after a short downward movement, again in the opposite direction, and then to again carry out a placement movement, which is directed downward, in this case until the final position is reached. By this measure, a preliminary positioning (centering) of the label sleeve which initially is only loosely positioned the bottle with its lower edge, is achieved, which is particularly advantageous in the case of label sleeves that are in a diagonal position.

BRIEF DESCRIPTION OF THE DRAWINGS

Below, preferred embodiment examples are described with reference to the figure. In the figures:

FIG. 2 is a vertical cross section along line I—I in FIG. 1.

DETAILED DESCRIPTION OF THE INVENTION

Figure 1:
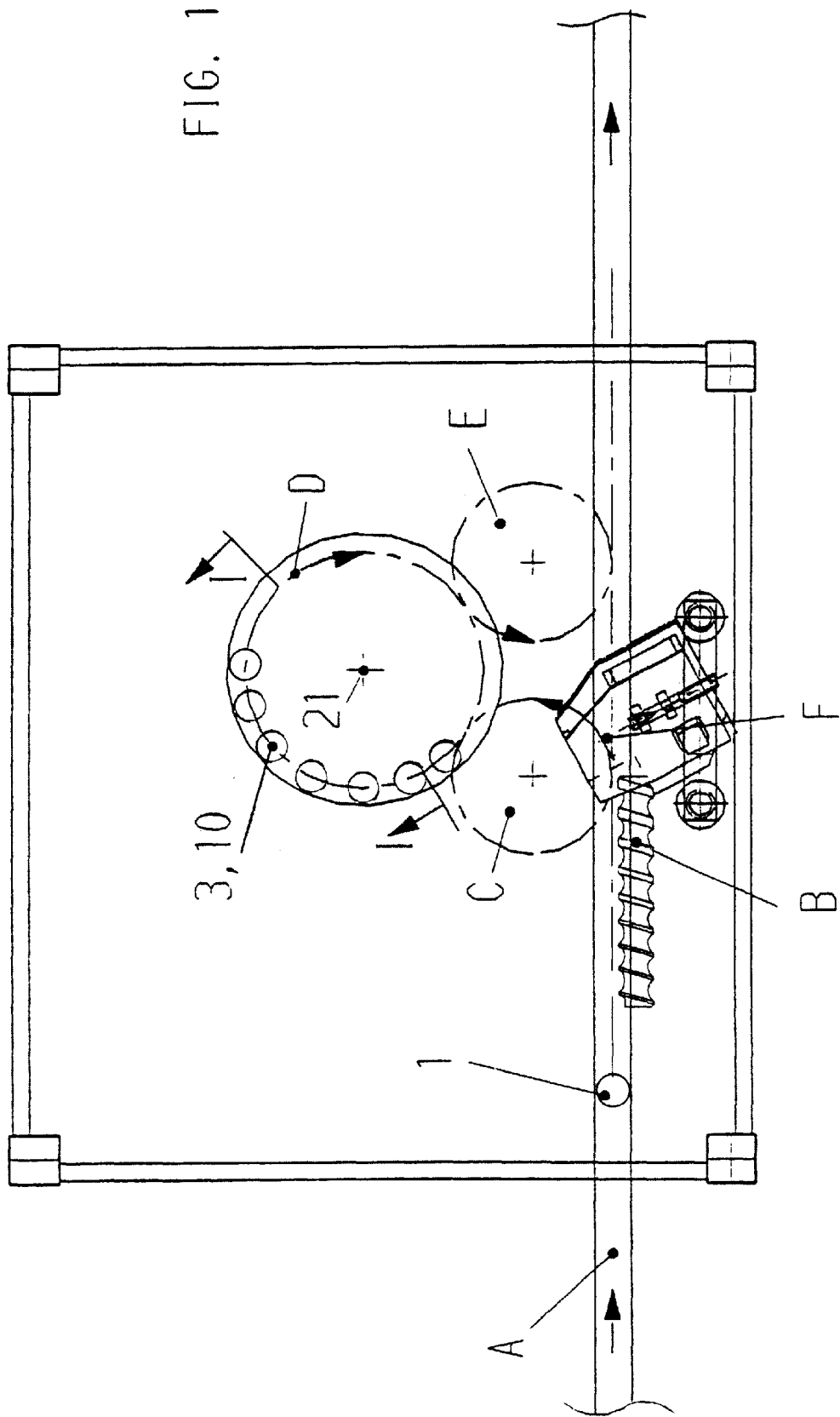
FIG. 1 shows a top view onto a machine for placing label sleeves onto bottles, in a schematic representation.

FIG. 1 shows a continuously working machine of the rotating construction type, which essentially consists of a conveyor A to supply and remove bottles 1, a one-part worm B, an inlet star wheel C, a carousel D, an outlet star wheel E, as well as a label tube cutting unit F, which is arranged above the inlet star wheel C. The above-mentioned construction components for transporting the bottles 1 are continuously driven in directions corresponding to the arrows, with synchronized speeds and positions.

The inlet star wheel C as well as the outlet star wheel E can be equipped, in a manner which is not further detailed, with controllable gripper devices to grip and release bottles 1 by their body and/or neck area. Corresponding star wheel constructions are known from U.S. Pat. No. 5,607,045.

The design of a label tube cutting unit F can, for example, be in accordance with DE-OS 2950785.

Carousel D has bottle plates 10 which are distributed over its circumference, at equal intervals, on a shared divided circle, with pusher arrangements 3 which are arranged coaxially above the carousel, and which can be lifted and lowered in a controlled manner. Carousel D is held in a bearing about a vertical rotation axis 21, in a manner so it can be continuously driven in a rotating movement.

From FIG. 2, the construction design of carousel D can be seen in detail. It essentially consists of a rotating table 7 which carries the bottle plates 10, and above it, a disk 12, which is located at a distance and presents apertures which are arranged so they are aligned with the bottle plates 10, as well as, above and again at some distance, a ring 20 which is also is provided with apertures which are aligned with the bottle plates 10. All three construction components 7, 12 and 20 are coupled to each other with torsional rigidity, and they are held in a bearing allowing rotation about the vertical machine axis 21. The apertures which are aligned in pairs, located in the disk 12 and the ring 20, are penetrated in each case by a pipe 9 which is led so it can be vertically moved, and to which a roller holder 16 is clamped, which carries on its side turned toward the rotation axis 21, a cam roller 17 in a bearing allowing free rotation. This cam roller 17 penetrates into the nut of a cam curve 18 which is held with torsional rigidity. To prevent torsion of the roller holder 16, the latter is led along a vertical cam rod 19, which is shown, in the right half of FIG. 2, in a position which is rotated outward by 90° in comparison to the normal position, and which is normally located, viewed in the direction of circumferential movement, behind the pipe 9 in an orientation parallel to the pipe.

In pipe 9, a coaxially moveable rod 11 is led, which extends outward, both at the top and at the bottom end of the pipe 9. At its top end, an abutment 15 is located, while at the bottom end, a centering bell 6 for a bottle head is attached, in a removable manner, and in a bearing allowing free rotation, On the rod 11, in the area between the upper end of the pipe 9 and a retaining ring 13, attached to the rod 11, a long coil spring 14 is arranged. By means of this coil spring 14, the rod 11 is permanently subjected to a positive force in the direction of the bottle plate 10.

At the end of the pipe 9 which is directed toward the bottle plate 10, a pipe-like apertured pusher 4 is rigidly clamped below the disk 12. In the cylindrical internal aperture of the first apertured pusher, a second apertured pusher 5 is led in a manner allowing axial shifting, which apertured pusher 4 is permanently subjected to a downward force in the direction toward a projection 4b, which is formed to form a steplike shape in the first apertured pusher 4, and which serves as bottom abutment, by means of a pressure spring 8 which rests on the first apertured pusher 4. On the second apertured pusher 5, a corresponding projection 5b is shaped, which can be applied against 4b.

While the first external apertured pusher 4 presents, on its side which is turned toward the bottle plate 10, a planar, horizontally oriented front surface 4a, the internal, second apertured pusher 5 presents an outer conical surface 5a. The internal diameter of the front side of the first apertured pusher 4 and the external diameter of the second apertured pusher 5 present a smaller dimension than the diameter of a label sleeve 2. The diameter is chosen in such a manner that the first apertured pusher 4, when the desired final position of the label sleeve 2 on a bottle 1 is reached, is not applied against the external side of the bottle, so that the sleeve cannot become jammed in the apertured pusher 4.

Figure 3:
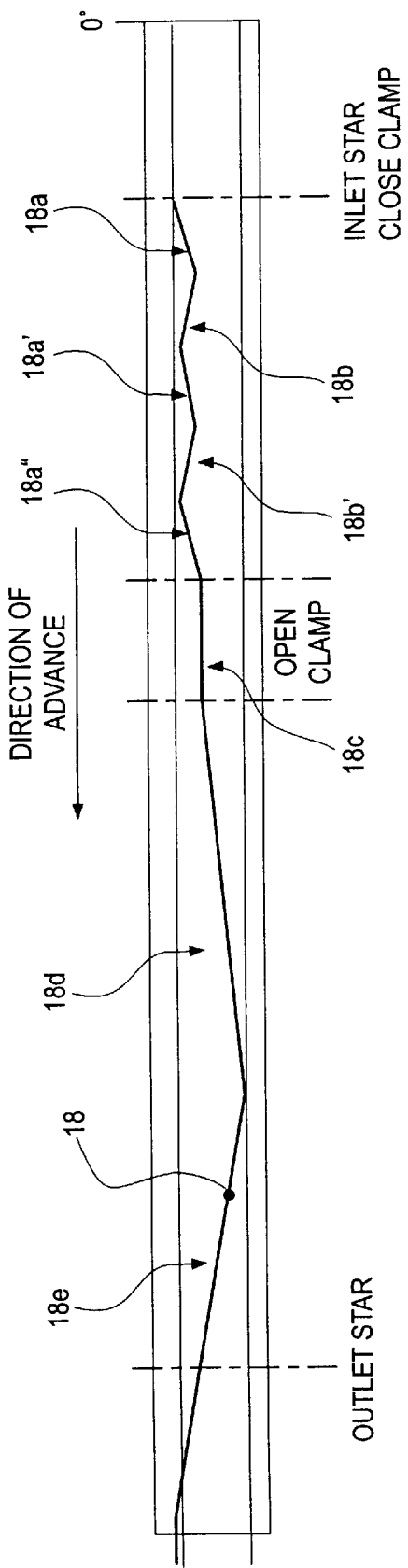
FIG. 3 is a development of the cam curve of FIG. 2.

FIG. 3 shows the development of the cam curve 18 used to control the height position of the pusher arrangements 3. Their zero degree setting is marked in FIG. 4 and it is located in the middle of the area between the outlet star wheel E and the inlet star wheel C.

Figure 4:
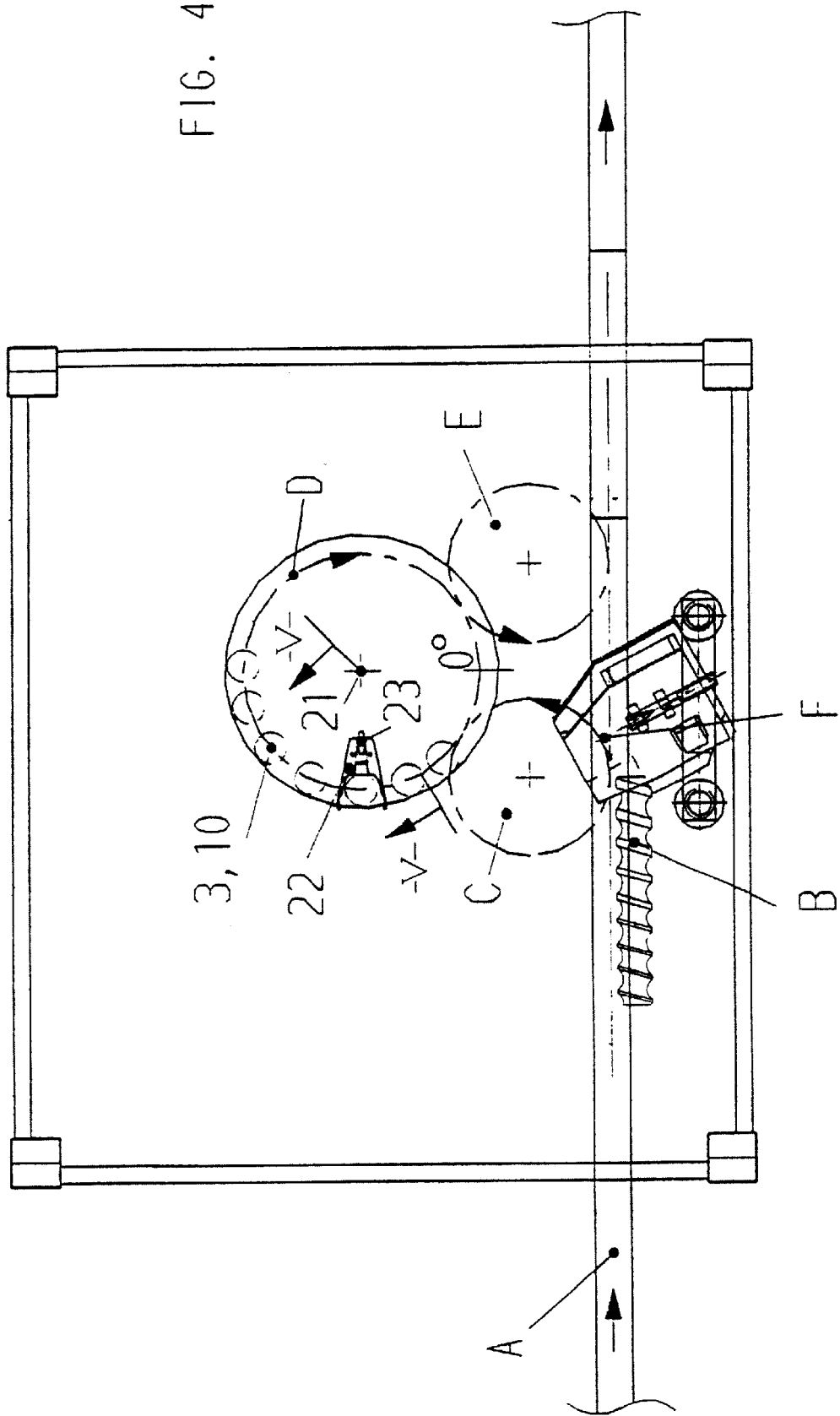
FIG. 4 is a diagrammatic top view onto a machine according to a second embodiment variant.
Figure 5:
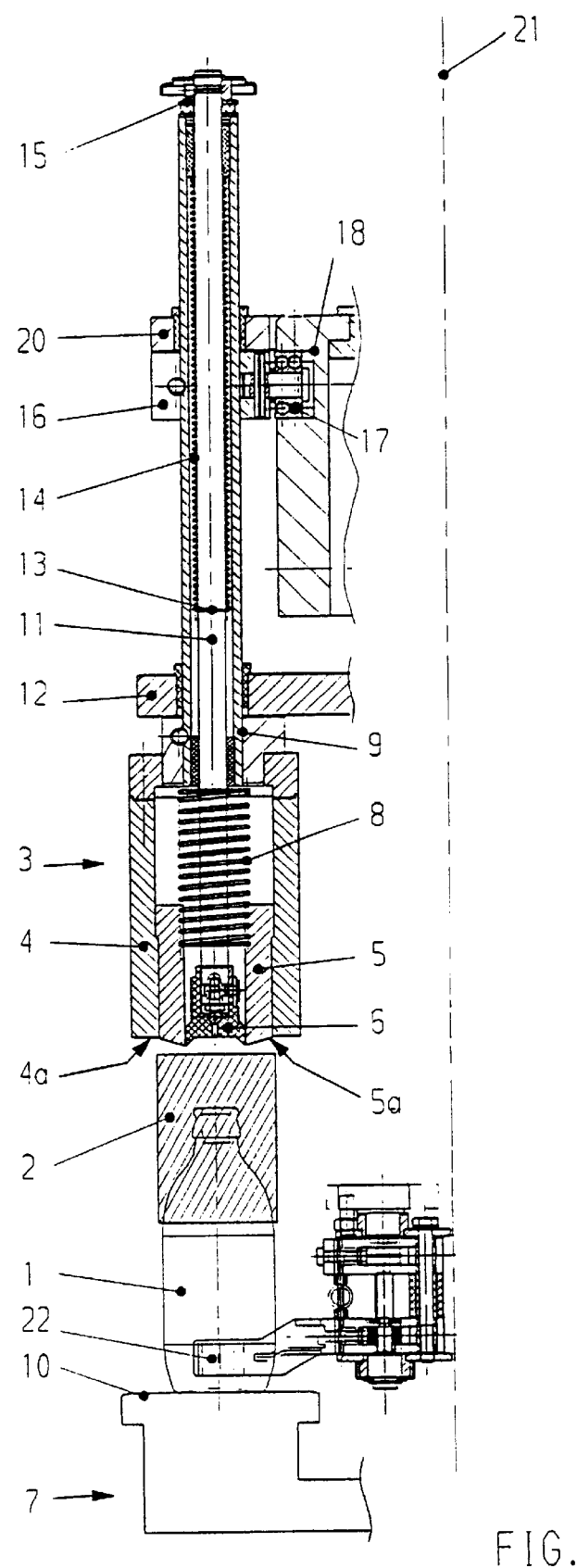
FIG. 5 is a vertical cross section along line V—V in FIG. 4.

According to FIGS. 4 and 5, a grip clamp 22 for the bottles 1 can be associated with each bottle plate 10, on the latter's radial internal side, which grip clamp is controllable and rotates on the rotating table 7, and is formed by a pair of levers which can be tilted in opposite directions. Between the levers, a control cam 23 is located for a targeted swinging of the levers toward each other or away from each other, to grip a bottle by its body in an area close to the bottom, or to release a bottle. For details, reference is again mde to U.S. Pat. No. 5,607,045.

The use of grip clamps 22 is advantageous if the rotational speed of the bottles on the rotating table 7 is so high that, in the case of the transport of free standing bottles, the bottles would start to slide or tip over. The result is an increase in the operational reliability, even in the case of a possible emergency stop of the machine.

The course of the process is described below with reference to the figures.

Bottles 1 which are supplied on the conveyor A on the inlet side are gripped by the one-part worm B, separated out onto the machine partition, and transferred to the inlet star wheel C. The inlet star wheel C leads the bottles under and past the stationarily arranged label tube cutting unit F, where, at that time, a label sleeve 2 presenting an excessively large diameter, is separated from a prefolded label tube and its bottom edge is partially placed on the bottle shoulder 1a(comparable to FIG. 2, left half). After the transfer of the bottle 1 to a bottle plate 10 of the rotating table 7, the bottle is gripped by a machine designed in accordance with FIG. 4, immediately after the transfer by the inlet star wheel 7, by a grip clamp 22 which holds it body surface close to the bottom. This occurs as a result of the actuation of the control cam 23 which can be tilted about a vertical axis. The entire pusher arrangement 3 is then, at the time of passage through a cam section 18a of the cam curve 18, first partially lowered downward in the direction toward the bottle 1, and then again lifted in the cam section 18b. During the lowering movement, the front surface 4a and optionally the outer conical surface 5a of the apertured pusher 4 or 5 for a short time comes in contact with the upper edge of the label sleeve 2, to center it and to partially move it axially downward. This process is repeated two more times during the passage through the cam sections 18a', 18b'and 18a". At the end of the cam section 18a", the centering bell 6 is applied to the top front surface of the bottle 1, so that the bottle, during the continuation of the process, is axially clamped between the centering bell and the bottle plate 10. During the passage through the next cam section 18c, the grip clamps are separated, in the case of a machine equipped with grip clamps 22 (embodiment according to FIGS. 4 and 5), so that they are no longer applied against the body surface of the bottle 1. During the passage of the subsequent cam section 18d, the pusher arrangement 3 is moved downward by the controlled curve roller 17, where the downward movement of the second apertured puser 5 is stopped at the time when the bottle shoulder 1a, which is sloped radially inward, is reached. The external, first apertured pusher 4, in contrast, continues to move downward until its lowest position is reached, which determines the height of adhesion of the label sleeve 2 on the bottle 1 (FIG. 2, right half of the figure). The subsequent cam section 18e, which moves upward, is designed so that when the point of transfer to the outlet star wheel E is reached, the top end of the pipe 9 is applied against the abutment 15, during which process the centering bell 6 is lifted from the bottle head by means of the rod 11.

We claim:

1. A device for placing label sleeves (2) onto containers (1) comprising in combination a first apertured pusher (4), which is positioned coaxially with respect to a container which carries a partially positioned label sleeve, and which can be moved forward and backward axially with respect to the longitudinal axis of the container and having an internal diameter that is at least slightly smaller than the diameter of the label sleeve (2), and a second pusher (5) arranged internally and coaxially with respect to said first apertured pusher, said second pusher being aligned with and adapted to move axially with respect to said first apertured pusher (4); wherein said second pusher (5) is also designed as an apertured pusher and is adapted to move axially in said first apertured pusher and relative to said first apertured pusher (4), and wherein in said second apertured pusher (5), a concentrically arranged centering bell (6) for the head of a container (1) is located, said centering bell (6) being adapted to moved coaxially with respect to said first and said second apertured pusher (5).

2. Device according to claim 1, wherein said first apertured pusher (4), said second apertured pusher (5) and said centering bell (6) can be reset with respect to the container (1) by means of only one cam curve (18).

3. Device according to claim 2, and an automatic resetting element (8, 14) associated with said second apertured pusher (5) and said centering bell (6).

4. Device according to claim 2, wherein said cam curve (18) presents in each case at least one cam section (18a, 18b, 18a', 18b', 18a") which lowers and then again raises said first and second apertured pushers (4, 5) and said centering bell (6) only partially with respect to a container (1).

5. Device according to claim 2, and at least one controllable grip device (22) associated with said first and second apertured pushers (4, 5) and said centering bell (6), to hold a container (1) by its body.

6. Device according to claim 5, wherein said cam curve (16) presents a cam section (18*c*), in which said centering bell (6) is applied to a container (1), and in which the lower edge of a label sleeve (2) which is slipped over the container is located in close proximity above said grip device (22).

7. A device for placing label sleeves (2) onto containers (1) comprising in combination a first apertured pusher (4), which is positioned coaxially with respect to a container which carries a partially positioned label sleeve, and which can be moved forward and backward axially with respect to the longitudinal axis of the container having an internal diameter that is at least slightly smaller than a diameter of the label sleeve (2), and a second pusher (5) arranged internally and coaxially with respect to said first apertured pusher, said second pusher being adapted to move axially with respect to said first apertured pusher (4), wherein said second pusher (5) is also designed as an apertured pusher and is aligned with and adapted to move relative to said first apertured pusher (4), and wherein in said second apertured pusher (5), a concentrically arranged centering bell (6) for the head of a container (1) is located, said centering bell (6) being adapted to move coaxially with respect to said first and said second apertured pusher (5), wherein in each case, said first apertured pusher (4), said second apertured pusher (5), and said centering bell (6) form a pusher arrangement (3) which is associated with a standing surface, and several said pusher arrangements (3) with associated said standing surfaces (10) are arranged at equal intervals on a shared section of a divided circle of a carousel which can be continuously driven in a rotating movement.

8. A device for placing label sleeves (2) onto containers (1) comprising in combination a first apertured pusher (4), which is positioned coaxially with respect to a container which carries a partially positioned label sleeve, and which can be moved forward and backward axially with respect to the longitudinal axis of the container having an internal diameter that is at least slightly smaller than a diameter of the label sleeve (2), and a second pusher (5) arranged internally and coaxially with respect to said first apertured pusher, said second pusher being adapted to move axially with respect to said first apertured pusher (4), wherein said second pusher (5) is also designed as an apertured pusher and is aligned relative to and adapted to move in said first apertured pusher (4), and wherein in said second apertured pusher (5), a concentrically arranged centering bell (6) for the head of a container (1) is located, said centering bell (6) being adapted led in a manner so it can be to move coaxially with respect to said first and said second apertured pusher (5), wherein said first apertured pusher (4), said second apertured pusher (5) and said centering bell (6) can be reset with respect to the container (1) by means of only one cam curve (18), and at least one controllable grip device (22) associated with said first and second apertured pushers (4, 5) and said centering bell (6), to hold a container (1) by its body, wherein said controllable grip device (22) holds a container (1) by its body close to the bottom thereof.

* * * * *

UNITED STATES PATENT AND TRADEMARK OFFICE
CERTIFICATE OF CORRECTION

PATENT NO. : 6,708,470 B2  
DATED : March 23, 2004  
INVENTOR(S) : Eiban et al.

It is certified that error appears in the above-identified patent and that said Letters Patent is hereby corrected as shown below:

Column 4,
Line 56, replace "moved" with -- move --

Column 6,
Line 21, replace "led in a mannar so it can be to move …" should read -- led in a manner adapted to move --

Signed and Sealed this

Twenty-ninth Day of June, 2004

JON W. DUDAS
*Acting Director of the United States Patent and Trademark Office*